Sept. 17, 1940.  R. G. GUTHRIE  2,215,323
ADSORPTIVE UNIT
Filed Oct. 24, 1938

Inventor:
Robert G. Guthrie.
By Brown, Jackson, Boettcher & Dienner
Attys.

Patented Sept. 17, 1940

2,215,323

UNITED STATES PATENT OFFICE 2,215,323

ADSORPTIVE UNIT

Robert G. Guthrie, Chicago, Ill., assignor to Peoples Gas By-Products Corporation, Chicago, Ill., a corporation of Illinois Application October 24, 1938, Serial No. 236,682

8 Claims. (Cl. 183—4)

My invention relates, generally, to adsorption means, and it has particular relation to adsorption means in which lamisilite flakes constitute the adsorbing material.

The more common adsorbing agents are activated carbon or charcoal, activated alumina, and silica gel. A relatively new adsorbing agent, known as lamisilite flakes, has been introduced into the adsorbing field which has excellent adsorbing characteristics. This adsorbing agent is described in Patent No. 1,898,774, of which I am co-patentee. Generally, the mechanism of adsorption is substantially the same whatever adsorbing agent is used, although each adsorbing agent may have preferential adsorbing ability for different substances.

Although the exact mechanism of adsorption is still a matter of dispute, it is now considered to be satisfactorily explained upon either of two theories. One theory is that adsorption is due to chemical combination of the gas adsorbed with the free valances of atoms on the surface of the adsorbing agent. The second theory is that adsorption is due to liquefaction of the adsorbed gas, and its retention by capillary action in the exceedingly fine pores or cracks of the adsorbing agent. In some cases, the data bear out one theory, while in other cases they bear out the other. There are also cases in which the data indicate that a combination of the two theories is involved, i. e., they are apparently superimposed. In all events, it is known that heat is evolved when a gas is adsorbed, and that this heat may be either due to the latent heat given up when the gas is liquefied or due to the heat of chemical combination, or due to both of these. Also it is known that the adsorbent capacity of an adsorbing agent is inversely proportional to its temperature and directly proportional to the pressure of the gas being adsorbed. However, these functions are not straight line functions, but they depend upon both the adsorbing agent and the gas being adsorbed.

It will be seen from the above brief discussion that in order to maintain efficient operation of an adsorptive unit, some means must be provided for removing the heat evolved, thereby preventing the temperature of the adsorbing agent from rising. And after an adsorbing agent has been saturated with adsorbed gas to the desired degree, the adsorbed gas must be released to regenerate the adsorptive unit. This release of the adsorbed gas is brought about by heating the adsorbing material above the boiling temperature of the adsorbed gas, generally at the pressure existing in the adsorptive unit, or at a reduced pressure. After the adsorbing agent has been heated and thereby regenerated, it must be cooled in preparation for the succeeding adsorbing cycle. It will thus be seen that in adsorption operations the problem of adding and removing heat from an adsorbing agent or material is involved. Since most adsorbing agents, including lamislite flakes, are very poor heat conductors, the solution of this problem is one of the most important difficulties involved in adsorption operations.

Accordingly, the object of my invention generally stated is to provide adsorptive means in which there is a high rate of heat transfer to and from the adsorbing agent.

More specifically, the object of my invention is to provide adsorptive means in which lamisilite flakes comprise the adsorbing material and which lamisilite flakes may be readily cooled during the adsorption stage and readily heated during the regenerating stage.

Other objects of my invention will, in part, be obvious, and in part appear hereinafter.

A heat transfer tube having excellent heat transfer characteristics may be secured by tearing up spines from a parent metal tube. For example, a one-inch copper tube may have rows of radially projecting spines about one-half inch in length torn up from it. Thus a section of the tube can be provided comprising a multitude of these radially projecting spines. Since these spines are integral with the parent tube and the continuity of the metal is not broken, the maximum possible heat transfer between the spines and parent tubes exists. It will be apparent that these radial spines might be individually or collectively soldered or welded to the parent tube. However, tearing up the spines from the parent tube appears to be the more logical method of construction.

Lamisilite flakes are much like ordinary household soap flakes in form, and they have excellent adsorbing capacity, especially for moisture. However, it has been difficult to provide a method for extracting and adding heat to any substantial quantity of these flakes because of their very low thermal conductivity.

I have found that by impaling these lamisilite flakes on the spines of a heat transfer tube of the type just described, an excellent adsorptive unit was provided. By having the flakes impaled in tight contact with the spines, they can be readily heated or cooled by alternately passing steam through the heat transfer tube to heat them and by passing cooling water through the heat transfer tube to cool them.

Accordingly, my invention is disclosed in the embodiment thereof shown in the accompanying drawing, and it comprises the features of construction, combination of elements, and arrangement of parts which will be exemplified in the description hereinafter set forth, and the scope of the application of which will be indicated in the appended claims.

For a more complete understanding of the nature and scope of my invention, reference may be had to the following detailed description, taken in connection with the accompanying drawing in which.

Figure 2:
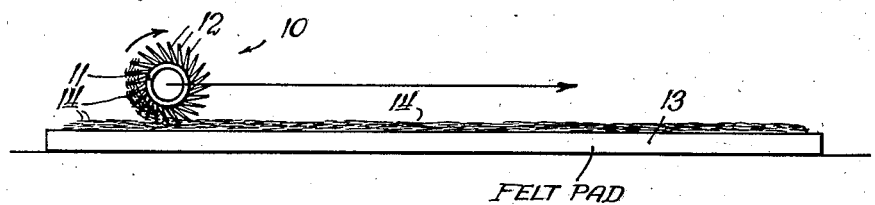
Figure 2 illustrates a method of impaling lamisilite flakes on the heat transfer tube.
Figure 3:
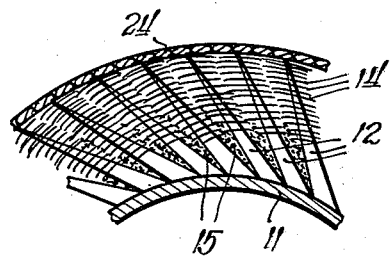
Figure 3 is a fragmentary cross-sectional view of the heat transfer tube showing how the lamisilite flakes are held on the spines.
Figure 4:
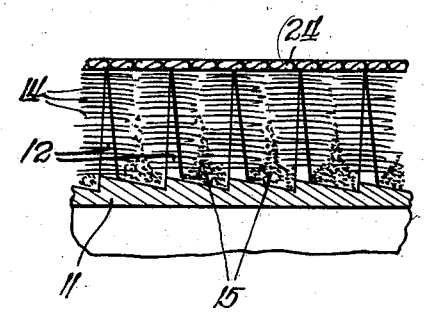
Figure 4 is part of a longitudinal view similar to Figure 3.

Referring now particularly to Figure 2 of the drawing, the reference character 10 designates generally a heat transfer tube of the type described above, comprising a main tube body 11 with projecting spines 12 torn up therefrom. A pad 13 is provided of a material that can be repeatedly punctured by the spines 12. A felt pad, somewhat thicker than the length of the spines 12, is well suited for this purpose. Lamisilite flakes 14 are spread over the pad 13 and the heat transfer tube 10 is rolled thereover. By rolling a number of times, the desired amount of flakes 14 may be impaled and picked up on the spines 12 and packed thereto the desired closeness. The manner in which the flakes 14 are impaled on the spines 12 is more clearly seen by referring to Figures 3 and 4. Also, some of the fines formed in rolling are shown at 15 in between the impaled flakes 14.

Figure 1:
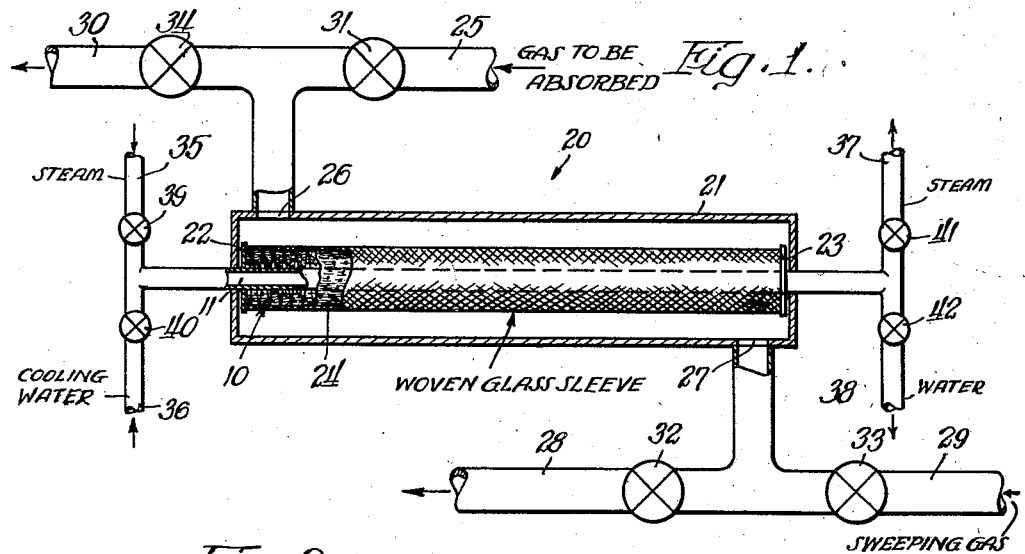
Figure 1 illustrates, diagrammatically, a simple working embodiment of my invention.

Referring now particularly to Figure 1 of the drawing, an adsorptive unit embodying my invention is shown generally at 20. The heat transfer tube 10 has its section of projecting spines enclosed in a housing 21. Flanges 22 and 23 are provided on opposite ends of the section of projecting spines to which a woven glass sleeve 24 may be secured. The sleeve 24 may be about the same weave as cheese cloth and prevents the lamisilite flakes 14 from being carried away, and also prevents particles of foreign material from striking and breaking the flakes 14. Gas, rich in a constituent to be adsorbed, may be supplied to the adsorptive unit 20 from a conduit 25 through an opening 26 in the housing 21 and may leave through an opening 27 and be drawn off through the conduit 28. Gas for sweeping away the adsorbed constituent during regeneration may be supplied from the conduit 29 and be drawn off through the conduit 30. The conduits 25, 28, 29, and 30 are provided with control valves 31, 32, 33, and 34, respectively. With a view to heating or cooling the heat transfer tube 10, it may be connected to a steam supply pipe 35 and a cooling water supply pipe 36. The steam may leave through a steam pipe 37 and the cooling water may leave through a water pipe 38. The pipes 35, 36, 37, and 38 are provided with control valves 39, 40, 41, and 42, respectively. In an adsorptive unit of greater capacity, the housing 21 will enclose a number of heat transfer tubes 10 which may be connected to steam and cooling water at common headers.

In operation, valves 31 and 32 are open, and valves 33 and 34 are closed during the adsorption stage. The heat transfer tube 10 is supplied with cooling water from the pipe 36 which leaves through the pipe 38. Therefore, valves 40 and 42 are open and valves 39 and 41 are closed during the adsorption stage. Gas rich in a constituent to be adsorbed is supplied under pressure through the conduit 25 and it leaves through the conduit 28, stripped of its adsorbed constituent. When the lamisilite flakes have reached their maximum efficient operating capacity and the adsorption stage is therefore completed, the valves 31 and 32 are closed and valves 33 and 34 are opened to initiate the regenerating stage. Concurrently, the cooling water is shut off by closing valves 40 and 42, and steam is turned on by opening valve 39 which escapes through valve 41.

During the adsorbing stage heat is evolved when the adsorbed constituent is liquefied. This evolved heat is quickly removed from the lamisilite flakes due to the cooling of the spines 12 by the cooling water flowing through the heat transfer tube 10. Accordingly, the adsorptive unit 20 operates continuously at its maximum efficiency. During the regenerating stage the steam passed through the heat transfer tube 10 rapidly heats the spines 12 and, in turn, the impaled lamisilite flakes 14. Accordingly, the adsorbed constituent is rapidly driven off and swept away by the gas from the conduit 29.

Due to the excellent heat conducting relationship which the impaled lamisilite flakes 14 have with the spines 12 of the heat transfer tube 10, the heat evolved during adsorption is quickly removed and the flakes 14 are maintained at substantially any low adsorption temperature desired; after the adsorption stage the flakes 14 are rapidly heated and maintained at any desired regenerating temperature; and after regeneration the flakes 14 are rapidly cooled again. Thus, not only is the adsorptive capacity of the adsorptive unit 20 maintained at maximum operating efficiency for both the adsorping and regenerating stages, but also the time required to change from one stage to the other is reduced to a minimum, all due to the high heat transfer rate possible.

It will be understood that although I have confined the description of my invention principally to lamisilite flakes as an adsorbing material, other adsorbing materials such as silica gel, activated alumina, and activated charcoal may also be used in like manner with the heat transfer tube 10, the principle of excellent heat transfer being available whatever the absorbing material used. However, due to the physical form of lamisilite flakes, i. e., like soap chips, they are particularly adaptable since a great number of them may be impaled, thereby giving an adsorptive unit of high unit capacity.

Since certain changes may be made in the foregoing embodiment of the invention and different materials may be employed without departing from the scope thereof, it is intended that all matter contained in the above description or shown in the accompanying drawing shall be interpreted as illustrative and not in a limiting sense.

I claim as my invention:

1. Adsorptive means comprising, in combination, a metal tube with integral spines torn up radially therefrom and lamisilite flakes carried by said spines by being individually transfixed thereon.

2. Adsorptive means comprising, in combination, a metal tube with integral spines torn up radially therefrom and lamisilite flakes individually penetrated by said spines and in direct heat conductive relation therewith.

3. In adsorbent apparatus, in combination, a body of metal adapted to transfer heat as an incident to the adsorbing process, a plurality of metallic spines projecting from said body, and adsorbing material in the form of flakes carried by said spines, the cross-sectional area of said spines being substantially smaller than the cross-sectional area of said flakes and said spines individually piercing said flakes to place them in intimate heat transfer relation therewith.

4. In adsorbent apparatus, in combination, a body of metal adapted to transfer heat as an incident to the adsorbing process, a plurality of spines projecting from said body, said spines being torn up from said body of metal to provide optimum heat transfer relation therebetween, and adsorbing material in the form of flakes carried by said spines, the cross-sectional area of said spines being substantially smaller than the cross-sectional area of said flakes and said spines individually piercing said flakes to place them in intimate heat transfer relation therewith.

5. In adsorbent apparatus, in combination, a metal tube adapted to transfer heat between a fluid therein and the outside thereof as an incident to the adsorbing process, a plurality of metallic spines projecting from the outer surface of said metal tube, and lamisilite flakes carried by said spines, the cross-sectional area of said spines being substantially smaller than the cross-sectional area of said flakes and said spines individually piercing said flakes to place them in intimate heat transfer relation therewith.

6. In adsorbent apparatus, in combination, a metal tube adapted to transfer heat between a fluid therein and the outside thereof as an incident to the adsorbing process, a plurality of spines projecting from the outer surface of said metal tube, said spines being torn up from the outer portion of said tube to provide optimum heat transfer relation therebetween, and lamisilite flakes carried by said spines, the cross-sectional area of said spines being substantially smaller than the cross-sectional area of said flakes and said spines individually piercing said flakes to place them in intimate heat transfer relation therewith.

7. In adsorbent apparatus, in combination, a metal tube adapted to transfer heat between a fluid therein and the outside thereof as an incident to the adsorbing process, a plurality of metallic spines projecting from the outer surface of said metal tube, lamisilite flakes carried by said spines, the cross-sectional area of said spines being substantially smaller than the cross-sectional area of said flakes and said spines individually piercing said flakes to place them in intimate heat transfer relation therewith, and a perforate sleeve enclosing said spines for protecting said flakes and permitting circulation of fluid therethrough.

8. In adsorbent apparatus, in combination, a metal tube adapted to transfer heat between a fluid therein and the outside thereof as an incident to the adsorbing process, a plurality of spines projecting from the outer surface of said metal tube, said spines being torn up from the outer portion of said tube to provide optimum heat transfer relation therebetween, lamisilite flakes carried by said spines, the cross-sectional area of said spines being substantially smaller than the cross-sectional area of said flakes and said spines individually piercing said flakes to place them in intimate heat transfer relation therewith, and a perforate sleeve enclosing said spines for protecting said flakes and permitting circulation of fluid therethrough.

ROBERT G. GUTHRIE.